US007674376B1

(12) United States Patent
Herman et al.

(10) Patent No.: US 7,674,376 B1
(45) Date of Patent: Mar. 9, 2010

(54) CENTRIFUGE WITH INTEGRAL DEPTH FILTER

(75) Inventors: Peter K. Herman, Cookeville, TN (US); Hendrik N. Amirkhanian, Cookeville, TN (US); Lee Currier, Cookeville, TN (US)

(73) Assignee: Cummins Filtration IP Inc., Minneapolis, MN (US)

( * ) Notice: Subject to any disclaimer, the term of this patent is extended or adjusted under 35 U.S.C. 154(b) by 1321 days.

(21) Appl. No.: 11/139,074

(22) Filed: May 27, 2005

(51) Int. Cl.
*B01D 36/00* (2006.01)
*B01D 33/073* (2006.01)
*B04B 3/00* (2006.01)
*B04B 7/16* (2006.01)
*B04B 9/06* (2006.01)

(52) U.S. Cl. .................... 210/297; 210/299; 210/360.1; 210/488; 494/36; 494/49

(58) Field of Classification Search ................. 210/297, 210/299, 360.1, 488; 494/36, 49
See application file for complete search history.

(56) References Cited

U.S. PATENT DOCUMENTS

| | | | | |
|---|---|---|---|---|
| 148,513 | A * | 3/1874 | Senderling | 494/36 |
| 1,914,999 | A * | 6/1933 | Maverick et al. | 208/183 |
| 2,495,095 | A * | 1/1950 | Ewbank | 210/492 |
| 2,650,022 | A * | 8/1953 | Fulton et al. | 494/49 |
| 2,750,107 | A * | 6/1956 | More | 494/36 |
| 2,799,448 | A * | 7/1957 | Lee | 494/49 |
| 2,856,076 | A * | 10/1958 | Whipple | 210/352 |
| 2,865,562 | A * | 12/1958 | Burke | 494/49 |
| 3,599,792 | A * | 8/1971 | Stripp | 210/130 |
| 4,334,994 | A | 6/1982 | Jensen | |
| 5,069,799 | A * | 12/1991 | Brownawell et al. | 210/749 |
| 5,785,849 | A * | 7/1998 | Mules | 210/297 |
| 6,364,822 | B1 | 4/2002 | Herman et al. | |
| 6,511,596 | B1 * | 1/2003 | Bogers | 210/295 |
| 6,540,653 | B2 | 4/2003 | Herman et al. | |
| 6,602,180 | B2 | 8/2003 | Herman et al. | |
| 7,250,126 | B2 * | 7/2007 | Haberkamp et al. | 264/86 |
| 2006/0032814 | A1 * | 2/2006 | Haberkamp et al. | 210/502.1 |

FOREIGN PATENT DOCUMENTS

| | | | |
|---|---|---|---|
| GB | 1532409 | A * | 11/1978 |

* cited by examiner

*Primary Examiner*—Thomas M Lithgow
(74) *Attorney, Agent, or Firm*—Hamre, Schumann, Mueller & Larson, P.C.; J. Bruce Schelkopf

(57) ABSTRACT

A centrifuge includes a rotor with one or more drive jet openings for rotating the rotor to separate particulate matter from a fluid. A filter element is disposed inside the rotor, and the filter element includes depth filter medium for removing from the fluid sticky contaminants having the same general density as the fluid, such as sludge or varnish compounds. The rotor has a split flow configuration in which a portion of the fluid is routed to the filter element and the rest of the fluid bypasses the filter element to maintain fluid pressure of the fluid discharged from the drive jet openings. In one form, the depth filter medium is impregnated with a chemical that changes a property of the fluid, like acidity. In another form, the depth filter material is contained in a capsule for easy disposal.

19 Claims, 6 Drawing Sheets

CENTRIFUGE WITH INTEGRAL DEPTH FILTER

BACKGROUND

The present invention generally relates to centrifuges, and more specifically, but not exclusively, concerns a centrifuge system that is able remove soot and other fine particles as well as harmful organic compounds from a fluid.

Diesel engines are designed with relatively sophisticated air and fuel filters (cleaners) in an effort to keep dirt and debris out of the engine. Even with these air and fuel cleaners, dirt and debris, including engine-generated wear debris, will find a way into the lubricating oil of the engine. The result is wear on critical engine components and if this condition is left unsolved or not remedied, engine failure. For this reason, many engines are designed with full flow oil filters that continually clean the oil as it circulates between the lubricant sump and engine parts.

There are a number of design constraints and considerations for such full flow filters, and typically these constraints mean that such filters can only remove those dirt particles that are in the range of 10 microns or larger. While removal of particles of this size may prevent a catastrophic failure, harmful wear will still be caused by smaller particles of dirt that get into and remain in the oil. In order to try and address the concern over small particles, designers have gone to bypass filtering systems which filter a predetermined percentage of the total oil flow. The combination of a full flow filter in conjunction with a bypass filter reduces engine wear to an acceptable level, but not to the desired level. Since bypass filters may be able to trap particles less then approximately 10 microns, the combination of a full flow filter and bypass filter offers a substantial improvement over the use of only a full flow filter.

Centrifuges, both self-driven and externally driven types, are routinely used for bypass filtering because of their ability to remove small particles from fluids like oil. On the other hand, it was discovered that centrifuges are not able to remove “sticky” or neutral density contaminant, like fuel-oil oligomer compounds (e.g., sludge/varnish compounds), because the density of these types of contaminants is nearly equal to that of oil. These sticky contaminants are usually formed when oil and fuel are mixed together in high temperature environments, such as in engines. If not removed, the sticky contaminant can harm engine performance by coating surfaces throughout the engine and causing premature plugging of the full-flow filters. Further, the acidic nature of some of these organic compounds results in premature corrosion of engine components. For instance, the main bearings in engines are typically lead coated, and the lead on the bearings is highly susceptible to corrosion when exposed to acids. In some applications, depending on engine type, operating condition, fuel type and the like, depth-medium bypass filters are able remove these neutral density contaminants, but depth-medium bypass filter are typically unable to remove fine particulates.

Thus, there is a need for improvement in this area of technology.

SUMMARY

One aspect concerns a centrifuge that includes a rotor configured to rotate for separating particulate matter from a fluid. A filter element is disposed inside the rotor, and the filter element includes depth filter medium for removing from the fluid contaminants having the same general density as the fluid.

Another aspect concerns a centrifuge that includes a rotor. The rotor has one or more drive jet openings for rotating the rotor to separate particulate matter from a fluid. A depth filter-medium is disposed in the rotor for removing neutral density contaminants from the fluid. The rotor includes a fluid bypass passage configured to bypass a portion of the fluid around the depth filter medium for maintaining pressure of the fluid from the drive jet openings to sustain rotational speed of the rotor.

A further aspect concerns a centrifuge that includes a rotor shell. A capsule is disposed inside the rotor shell, and the capsule has walls configured to collect particulate matter from a fluid during rotation of the capsule. A filter element is disposed in the capsule, and the filter element includes depth filter medium for filtering contaminants from a fluid.

The capsule is removable from the rotor shell for disposal of the particulate matter and the contaminants in the depth filter medium.

Further forms, objects, features, aspects, benefits, advantages, and embodiments of the present invention shall become apparent from the detailed description and drawings provided herewith.

DESCRIPTION OF SELECTED EMBODIMENTS

Figure 1:
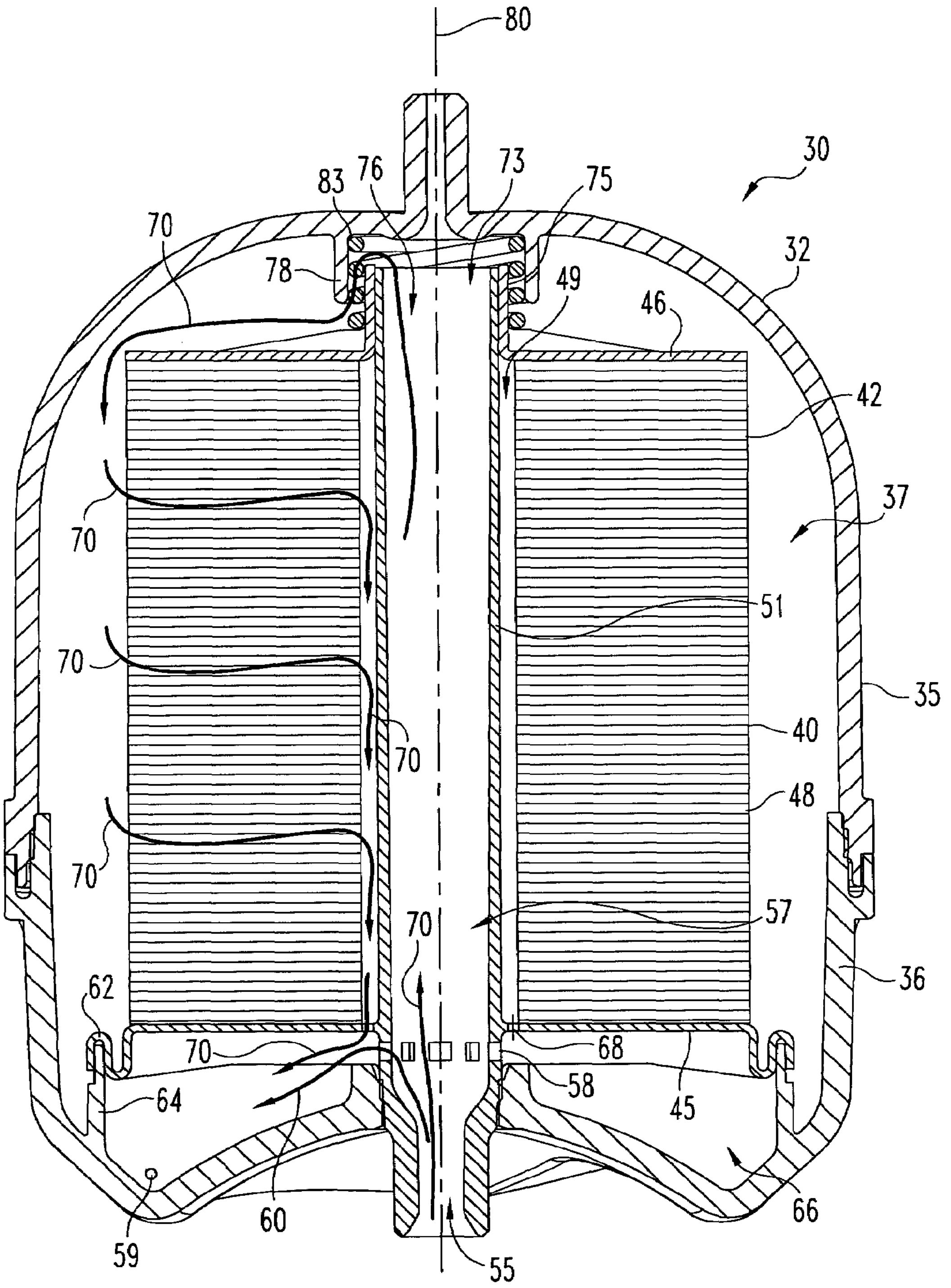
FIG. 1 is a cross-sectional view of a centrifuge assembly according to one embodiment.

For the purpose of promoting an understanding of the principles of the invention, reference will now be made to the embodiments illustrated in the drawings and specific language will be used to describe the same. It is understood that the specific language and figures are not intended to limit the scope of the invention only to the illustrated embodiment. It is also understood that alterations or modifications to the invention or further application of the principles of the invention are contemplated as would occur to persons of ordinary skill in the art to which the invention relates. One embodiment of the invention is shown in great detail, although it will be apparent to those skilled in the relevant art that some features that are not relevant to the present invention may not be shown for the sake of clarity.

A centrifuge assembly 30 according to one embodiment, among many embodiments, is illustrated in FIG. 1. As shown in FIG. 1, the centrifuge 30 includes a rotor 32 with upper (first) 35 and lower (second) 36 rotor shells mated together to form a rotor shell cavity 37. Inside the rotor shell cavity 37, the centrifuge 30 includes a filter element 40 configured to remove neutral-density contaminants, such as sludge/varnish compounds, which cannot be removed by centrifugal force alone. The filter element 40 includes depth filter medium 42 that is sandwiched between a base plate 45 and a compression plate 46. In contrast with surface filters, such as membranes, that tend to quickly plug, the depth filter medium 42 contains an internal porous structure with a tortuous flow path that is able to capture the contaminants inside the medium 42. It is theorized that depth filter medium 42 has internal polar surfaces that attract and capture the neutral-density contaminants because the contaminants are likewise polar in nature.

Figure 2:
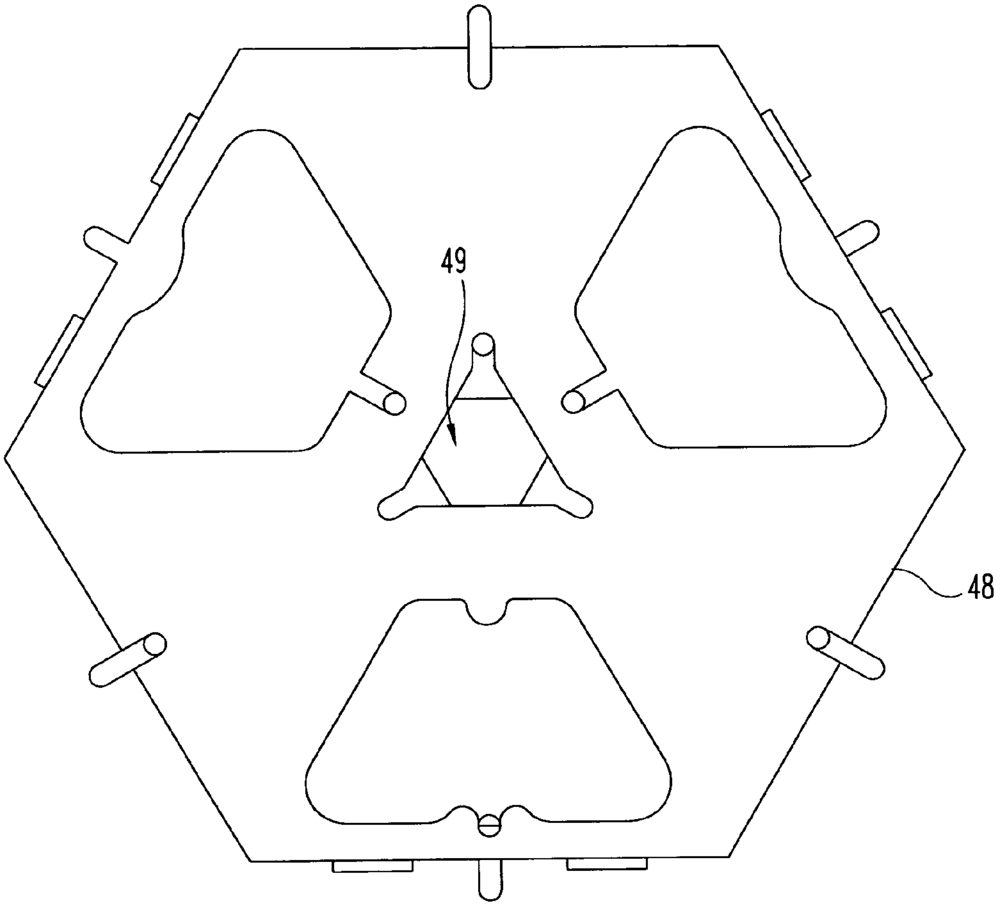
FIG. 2 is a top view of a depth filter element used in the FIG. 1 centrifuge.

In the illustrated embodiment, the depth filter medium 42 includes a stacked-disk depth-filter, which includes a stack of filter disks 48 of the type illustrated in FIG. 2. The filter disks 48 are made of a porous filter material that filters the sticky or neutral-density contaminants from the fluid. The filter disks 48 in one form are made of a cellulose material that removes the neutral density contaminants from the fluid, and the filter disks 48 are stacked upon one another to form the depth filter medium 42. The depth filter medium 42 can be made from a wet or air laid cellulose and/or synthetic materials that form a tortuous path for filtering the fluid. As can be seen, the filter disk 48 in FIG. 2 has a hexagonal shape, but it should be recognized that the filter disks 48 can be shaped differently in other embodiments. For nonlimiting examples of different types of stacked-disk depth-filters that can be used in the embodiments shown, please refer to U.S. Pat. No. 4,334,994 to Jensen, which is incorporated by reference in its entirety. Also, it is possible to use depth medium configurations other than stacked-disk cellulose bypass material, such as wrapped cylinder or pleated configurations of synthetic materials, organic fibers like cotton and/or microglass, to name a few nonlimiting examples. The filter disks 48 define center tube or axle opening 49 through which a center tube or axle 51 extends. As mentioned before, excessive oil acidity can enhance engine component corrosion. In addition, a chemical additive can be added to the depth filter medium 42 to provide chemical neutralization. For example, the depth filter medium 42 can be impregnated with an immobilized chemical additive, like MgO, to neutralize acidity in the fluid. Additional possible chemical base additives that can be used to neutralize acids can include metal oxides like $Na_2O$, $K_2O$, or CaO, or metal hydroxides like NaOH, KOH, $Mg(OH)_2$, $Ca(OH)_2$, to name a few examples. For other examples of chemical additives and techniques for impregnating chemical additives, please refer to U.S. patent application Ser. No. 10/916,299, filed Aug. 11, 2004, which is hereby incorporated by reference in its entirety. In contrast to surface filters, which provide little opportunity for the chemical additive to interact with the fluid, the depth filter medium 42 has a tortuous flow path that provides an ample opportunity for the fluid to interact with the impregnated chemicals.

Previously, it was thought that depth filter medium had a number of significant drawbacks that made its incorporation into a centrifuge to be practically impossible, especially for self-driven centrifuges, like Hero type centrifuges. First, the filter medium takes up space in the centrifuge rotor, which is detrimental to rotor capacity. Second, the tortuous flow path through the depth filter medium creates flow restrictions that result in a significant pressure drop in the fluid across the depth filter medium. The resulting low pressure fluid from the jet nozzles in the centrifuge rotor is unable to rotate the rotor to an adequate operational speed in order to separate particulate matter from the fluid. It, however, was discovered that in a split flow centrifuge design, in which only a fraction of the fluid in the centrifuge is routed to the depth filter medium for cleaning, while the rest of the fluid is used to directly drive the jets, provided acceptable performance. Although only a small percentage of the fluid is cleaned every minute, over time the percentage of cleaned fluid adds up so that the entire fluid supply is eventually cleaned; say, in less than two hours. Since most of the fluid flow bypasses the depth filter medium and is diverted to the jets, the fluid discharged from the jets has sufficient pressure so that the centrifuge rotor is able to operate at speeds sufficient for removing particles from the fluid.

The centrifuge 30 in FIG. 1 incorporates a split flow design that allows the incorporation of depth filter medium 42 into the centrifuge. Referring again to FIG. 1, the one end of the axle 51 extending from the lower rotor shell 36 is configured to engage a bearing such that the axle 51 and the rotor 32 are able to rotate together for centrifuging the fluid. The axle 51 defines an inlet port 55 through which fluid is supplied to the centrifuge 30. In the illustrated embodiment, the axle 51 around the inlet port 55 has a wall thickness that is sized to support the axle 51 against the bearing, but it should be appreciated that the wall thickness of the axle 51 around the inlet port 55 can be sized differently in other embodiments. The axle 51 further defines a fluid passageway 57 through which the fluid is transported in to the rotor 32. Along the fluid passageway 57, the axle 51 has one or more discharge ports 58 from which a portion of the fluid flow is directly discharged from one or more jet orifices 59 in the lower rotor shell 36, as is depicted with flow arrow 60. As shown, the discharge ports 58 are disposed between the base plate 45 and the lower rotor shell 36. The fluid discharged from the jet orifices 59 drives the rotor 32 so that the rotor 32 is able to rotate. However, it should be recognized that the centrifuge 30, alternatively or additionally, can be driven in other manners to maintain operational speed, such as via a Pelton type turbine and/or an electric motor, to name just a few examples.

Near its radial outer edge, the base plate 45 has a shell engagement structure 62 in the form of a unshaped channel that engages a base plate engagement rib 64 on the lower rotor shell 32. The shell engagement structure 62 in one form seals with the rib 64 so as to prevent fluid bypassing the depth filter medium 42 at an outward radial position, which is known to generate fluid eddies in the rotor shell cavity 37 that in turn hinder the ability of the rotor to collect submicron particles like soot. In the illustrated embodiment, the inner radial edge of the base plate 45 is integrally formed with the axle 51, but in other embodiments, the base plate 45 can be attached in other manners or even be separate from the axle 51. Together, the base plate 45 and the lower rotor shell 32 define a drive cavity 66 from which the fluid is discharged out the jet orifices 59. It is envisioned that in other embodiments the depth filter medium 42 can be disposed inside the drive cavity 66 so that the fluid driving the rotor 32 through the drive jet openings 59 is filtered. In such an embodiment, the filter element 40 inside the shell cavity 37 can for example be replaced with a spiral vane and/or cone stack structure, or can be eliminated altogether.

Around the axle or center tube 51, the base plate 45 has one or more cleaned fluid openings 68 through which fluid cleaned by the depth filter medium 42 enters the drive cavity 66. In other embodiments, the opening 68 includes a gap that is formed between the base plate 45 and the axle 51 when the two are separate components. Looking at the FIG. 1 embodiment, the fluid flows along two different flow paths, as indicated by flow arrows or paths 60 and 70. However, it is contemplated that the fluid can flow in other manners. For example, when the rotor 32 is externally driven, the discharge ports 58 can be eliminated so that the fluid flows solely along flow path 70 such that only cleaned fluid is discharged from the jet openings 59, thereby supplementing rotor speed.

At the end opposite the inlet port 55, the fluid passageway 57 in the axle 51 has an outlet port 73 from which the fluid is discharged into the rotor shell cavity 37. Near the outlet port 73, the compression plate 46 has an axle collar 75 with an axle opening 76 that is slidably received around the axle 51. As shown in FIG. 1, a portion of the axle 51 extends inside a centering collar 78 in the upper rotor shell 35 for centering the axle 51 along central longitudinal axis 80 of the rotor 32. Inside the centering collar 78, a bias member 83 extends between the upper rotor shell 35 and the compression plate 46 for compressing the depth filter medium 42 between the compression plate 46 and the base plate 45. In the embodiment shown, the bias member 83 includes a coil spring, but it should recognized that the bias member 83 can include other types of biasing mechanisms, like other types of springs, pneumatic pistons, hydraulic pistons, motors and/or electrical actuators, to name a few nonlimiting examples. The axle collar 75 of the compression plate 46 seals around the axle 51 to prevent fluid bypassing the depth filter medium 42, but still allows the compression plate 46 to slide in a telescoping fashion such that the compression plate 46 is able to compensate for expansion and contraction of the depth filter medium 42. In another embodiment, a snap-fit clip is added to retain the compression plate 46, bias member 83, and the depth filter medium 42 to the center tube 51, thereby making the filter element 40 and the center tube 51 a self-contained sub-assembly that does not need force input from the top rotor shell 35, which might cause variability in a spin-welding operation during assembly.

During operation, the fluid flows through the inlet port 55 of the axle 51. In the illustrated embodiment, a portion of the fluid flow is diverted to the drive jet openings 59 through the discharge ports 58, as indicated with flow arrow 60 in FIG. 1, and the rest of the fluid travels along the fluid passageway 57 in the axle 51, as is depicted with flow arrows 70. It should be recognized that in other embodiments, where the discharge ports 58 are eliminated, all of the fluid flows along flow path 70 such that only cleaned fluid is discharged from the jet openings 59. Fluid from the fluid passageway 57 in the axle 51 is discharged from the axle opening 76 into the rotor shell cavity 37. As shown by flow arrows 70 in FIG. 1, the fluid is routed radially outwards by the compression plate 46, and the fluid then is distributed across the axial length of the filter element 40, before passing radially inward through the depth filter medium 42. During this entire period of time, from entrance into separation zone near the bias member 83 to exiting through the cleaned fluid openings 68 in the base plate 45, particulate matter is being separated by centrifugal force, which cakes on the inner wall of the rotor 32. As the flow passes through the depth filter medium 42, additional fine particulates, such as those 2-10 microns in size, can be removed, but more importantly, the neutral density sticky compounds, like sludge/varnish are collected. Optionally, if the depth filter medium 42 contains a chemically active additive, such as MgO, harmful chemicals in the fluid like acids in oil can be reduced or neutralized. After passing through the filter element 40, the cleaned fluid collects in the annular gap between filter element 40 and axle 51, and from the annular gap, the fluid is discharged out the fluid openings 68 in the base plate 45. After passing through the fluid openings 68, the fluid merges with the split-flow fluid fraction from the discharge ports 58 and continues on to the jets 59 where the fluid is discharged at high velocity, thereby providing rotational driving torque for the centrifuge 30. As should be recognized with such a design, the centrifuge 30 in the illustrated embodiment provides high capacity, soot separation as well as removal of sticky density neutral compounds.

Figure 3:
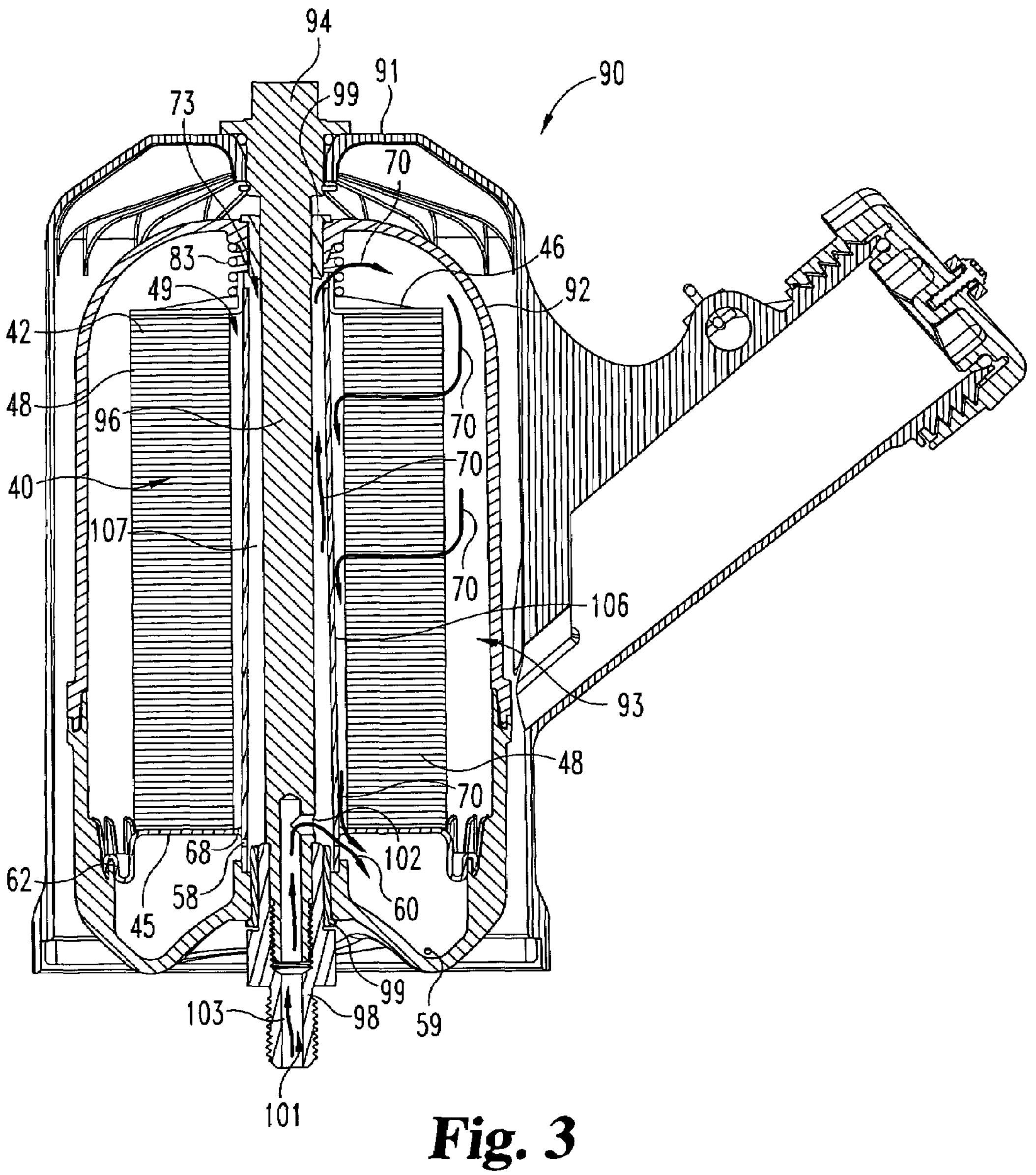
FIG. 3 is a cross-sectional view of a centrifuge assembly according to another embodiment.

It should be appreciated that the features of the above-described centrifuge 30 can be incorporated into other types of centrifuges. For instance, a centrifuge assembly 90 according to another embodiment is illustrated in FIG. 3. The FIG. 3 centrifuge 90 shares a number of components in common with the FIG. 1 centrifuge 30, and for the sake of clarity as well as brevity, these common components will not be again discussed in great detail below. As shown, the centrifuge 90 includes a housing 91 and a rotor 92 that rotates within the housing 91. The rotor 92 defines a rotor shell cavity 93 in which filter element 40 is disposed. A fixed axle or shaft 94, which is coupled to the housing 91, extends within the housing 91 and through the rotor shell cavity 93. In the illustrated embodiment, the shaft 94 has a split shaft design that includes an axle portion 96 threadedly secured to a collar or stub 98. The rotor 92 is rotatably coupled to the shaft 94 through a pair of bearings 99 that are disposed on opposite ends of the rotor 92. As such, the rotor 92 during operation rotates about the shaft 94. Instead of the illustrated stub-axle design, it should be recognized that other embodiments can utilize other types of axle-bearing configurations as would occur to those skilled in the art. Referring to FIG. 3, the shaft 94 defines a fluid supply passage 101 with a supply port 102 that supplies the fluid to the rotor 92, as indicated by flow arrows 103. Like the previous embodiment, the centrifuge 90 includes filter element 40 with filter medium 42 that is sandwiched between base plate 45 and compression plate 46. A center tube 106 extends within the filter element 40 between the base plate 45 and the compression plate 46. In the illustrated embodiment, the center tube 106 is integrally formed with the base plate 45, but the center tube 106 in other embodiments can be separate from the base plate 45. Like before, the compression plate 46 is sealed against and slidable in a telescoping fashion relative to the center tube 106.

As can be seen with flow arrow 60 in FIG. 3, the center tube 106 has one or more discharge ports 58 that directly supply fluid to one or more jet orifices 59 in the rotor 92. The rest of the fluid, which is to be cleaned, flows in flow passage 107 in the center tube 106 that is located between the shaft 94 and the center tube 106, as is depicted with flow arrows 70. The flow passage 107 in the center tube 106 has outlet port 73 from which the fluid is discharged into the rotor shell cavity 93. The base plate 45 has one or more clean fluid openings 68 surrounding the center tube 106 that supply cleaned fluid from the annular gap between the filter element 40 and the center tube 106. As indicated with flow arrows 70, the fluid from the clean fluid openings 68 is combined with the bypass fluid from the discharge ports 58, and discharged from the jet openings 59 in order to rotate the rotor 92. The centrifuge 90 operates in a fashion similar to the one described above with the exception that the rotor 92 rotates about the fixed shaft 94 via the bearings 99. As the rotor 92 rotates, the particulate matter in the fluid cakes on the inside walls of the rotor 92, and the filter element 40 removes the neutral density, sticky compounds from the fluid.

Figure 4:
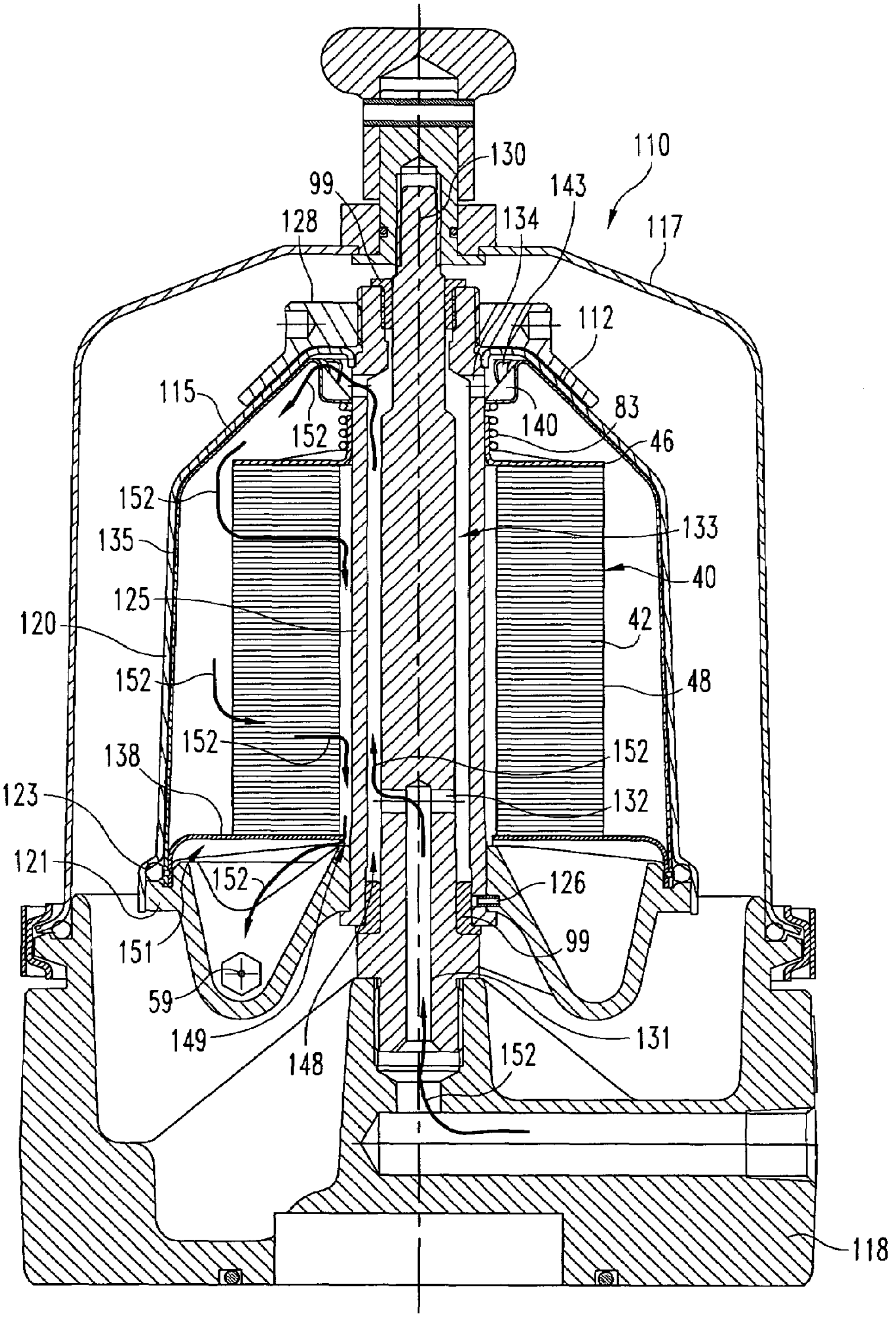
FIG. 4 is a cross-sectional view of a centrifuge assembly according to a further embodiment.

FIG. 4 illustrates a centrifuge assembly 110 according to a further embodiment. The FIG. 4 centrifuge 110 shares a number of components in common with the previous embodiments, and for the sake of clarity as well as brevity, these common components will not again be discussed in great detail, but reference is made to the previous discussion. In the FIG. 4 embodiment, the centrifuge 110 includes a take-apart rotor 112 that houses a sludge capsule 115 that can be discarded and replaced with a new one on an as needed basis and/or during routine maintenance. Since the entire sludge capsule 112 is discarded, cleaning of the centrifuge 110 is simplified. As depicted, the rotor 112 is housed in a housing or cover 117 that is coupled to a base 118, and the rotor 112 includes an upper 120 and lower 121 rotor shells that are coupled together in a take-apart manner to permit access to the sludge capsule 112. A seal 123 seals between the upper 120 and lower 121 rotor shells. It should be noted that the terms "upper", "lower" and other directional terms are used merely for the convenience of the reader when reviewing the drawings, and it is not intended that these directional terms limit the embodiments to a specific orientation. In the illustrated embodiment, the lower rotor shell 121 defines one or more jet openings 59 for discharging the fluid to rotate the rotor 112, but it should be appreciated that the rotor 112 can be rotated in other manners.

As shown, a center tube 125 extends through both the upper 120 and lower 121 rotor shells. The center tube 125 is pinned to the lower rotor shell 121 via a pin 126, and a collar 128 is threadedly coupled to the center tube 125 near the upper rotor shell 120 such that the rotor shells 120, 121 can be separated apart. Bearings 99 are disposed on opposite ends of the rotor 112 to allow rotation of the rotor 112 about an immovable axle or shaft 130 that is secured to both the housing 117 and the base 118. The shaft 130 defines a fluid supply passage 131 that receives fluid from the base 118, and the fluid supply passage 131 has one or more supply ports 132 that supply the fluid to an annular fluid passage 133 that is defined between the center tube 125 and the shaft 130. Near the collar 128, by the upper rotor shell 120, the center tube 125 defines one or more fluid discharge ports 134 that supply fluid to the capsule 115.

Figure 5:
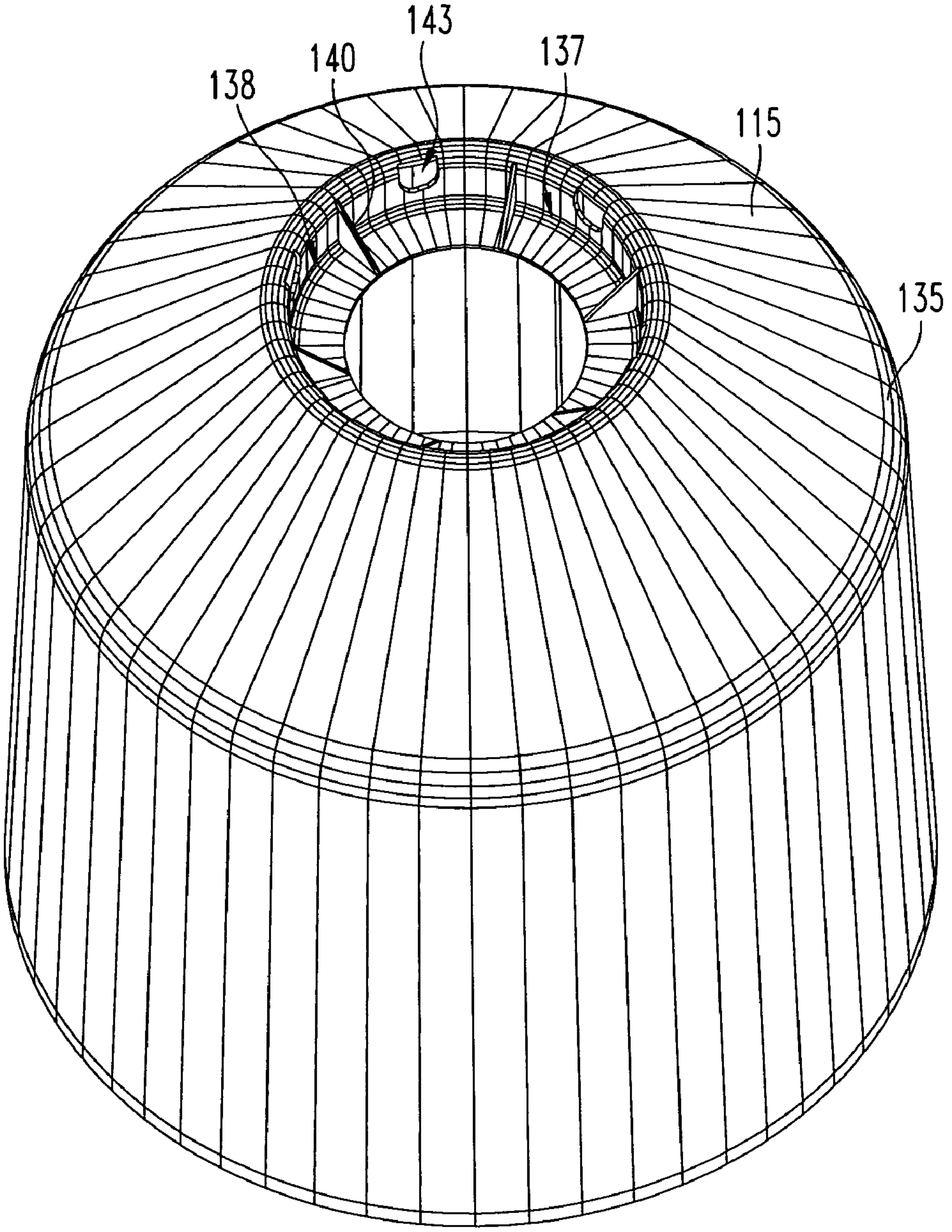
FIG. 5 is a top perspective view of a sludge capsule for the FIG. 1 centrifuge.
Figure 6:
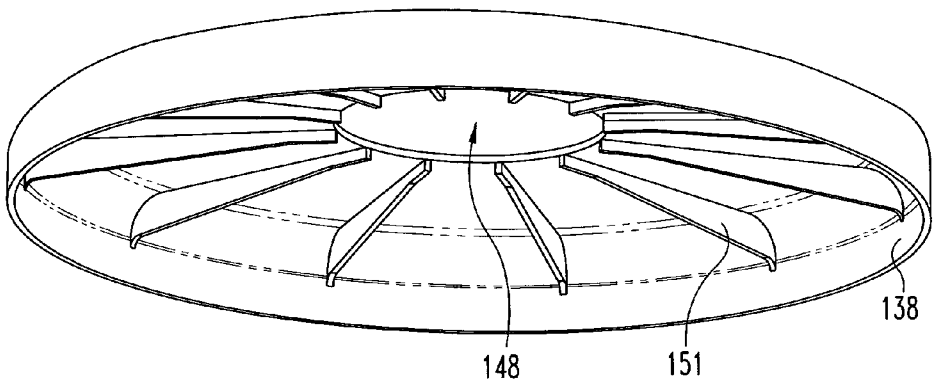
FIG. 6 is a bottom perspective view of a bottom plate for the FIG. 5 sludge capsule.

Referring to FIGS. 4, 5 and 6, the capsule 115 includes an outer cover or shroud 135 that is attached to a base plate 138. Near the discharge ports 134 in the center tube 125, the shroud 135 has a fluid inlet cavity 138 with one or more vanes 140 that strengthen the capsule 115 at the inlet cavity 138 as well as reduce fluid slippage (FIG. 5). Between the vanes 140, the shroud 135 has on or more fluid supply holes 143 through which fluid is supplied to the capsule 115. Looking at FIG. 4, the capsule 115 contains filter element 40 with depth filter medium 42 in the form of stacked cellulose disks 48 that are sandwiched between compression plate 46 and the base plate 138. Bias member 83, which in the illustrated embodiment includes a spring, is disposed between the compression plate 46 and the shroud 135 so as to press the compression plate 46 against the depth filter medium 42, thereby compensating for expansion and contraction of the depth filter medium 42. With reference to FIGS. 4 and 6, the base plate 138 defines a center tube opening 148 that is slightly larger than the center tube 125 to form an annular discharge gap 149. The base plate 138 further includes one or more ribs 151 that extend in a radial manner to strengthen the base plate 138. Further, the ribs 151 space the base plate 138 from the lower rotor shell 121 to allow fluid flow from the gap 149 to the jet openings 59.

During operation, fluid from the base 118 flows through the fluid supply passage 131 in the shaft 130 and into the annular fluid passage 133 in the center tube 125, as is indicated with flow arrows 152 in FIG. 4. From the discharge ports 134 in the center tube 125, the fluid flows through the fluid supply holes 143 in the capsule 115. Inside the capsule 115, particulate matter is separated by centrifugal force, which cakes on the inner wall of the capsule 115. As the flow passes through the depth filter medium 42, additional fine particulates can be removed, and the neutral density sticky compounds, like sludge/varnish, are collected. Again, if the depth filter medium 42 contains a chemically active additive, such as MgO, chemicals in the fluid, like acids carried in oil, are neutralized. After passing through the filter element 40, the cleaned fluid collects in the annular gap between filter element 40 and the center tube 125. Fluid then flows through the discharge gap 149 in the base plate 138 and out the jet openings 59, which in turn causes the rotor 112 to rotate. Again, it should be recognized that the centrifuge 110 in the illustrated embodiment provides high capacity, soot separation as well as removes of sticky density neutral compounds. Although the FIG. 4 centrifuge 110 has a full flow design, it is envisioned that the centrifuge 100 can be modified to have a split flow design in order to increase the operational speed of the centrifuge 100.

While the invention has been illustrated and described in detail in the drawings and foregoing description, the same is to be considered as illustrative and not restrictive in character. It should be understood that only the preferred embodiments have been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A centrifuge, comprising:

a rotor configured to rotate for separating particulate matter from a fluid;

a filter element disposed inside the rotor, the filter element including depth filter medium for removing from the fluid contaminants having the same general density as the fluid;

a base plate;

a center tube extending through the depth filter medium for transporting the fluid;

a compression plate slidably disposed along the center tube, wherein the depth filter medium is sandwiched between the base plate and the compression plate; and a bias device to bias the compression plate against the depth filter medium for compensating for contraction and expansion of the depth filter medium.

2. The centrifuge of claim 1, wherein:

the rotor includes one or more drive jet openings for rotating the rotor; and the rotor has a split flow configuration in which a portion of the fluid is routed to the filter element and the rest of the fluid bypasses the filter element to maintain fluid pressure of the fluid discharged from the drive jet openings.

3. The centrifuge of claim 1, wherein the depth filter medium is impregnated with a chemical that changes a property of the fluid.

4. The centrifuge of claim 3, wherein:

the fluid includes oil; and the chemical is selected from a group consisting of MgO, $Na_2O$, $K_2O$, CaO, NaOH, KOH, $Mg(OH)_2$, and $Ca(OH)_2$ for reducing the acidity of the oil.

5. The centrifuge of claim 1, further comprising a capsule in which the filter element is disposed, wherein the capsule is configured for disposal during maintenance.

6. The centrifuge of claim 1, wherein the depth filter medium includes a stack of cellulose disks.

7. The centrifuge of claim 1, further comprising:

a base plate disposed in the rotor to form a drive cavity;

wherein the rotor has one or more drive jet openings in the drive cavity for rotating the rotor; and wherein the depth filter medium is disposed in the drive cavity.

8. The centrifuge of claim 1, wherein the bias device includes a spring.

9. The centrifuge of claim 1, further comprising:

means for separating the particulate matter from the fluid, wherein the means for separating the particulate matter includes the rotor; and means for removing the contaminants from the fluid having the same density as the fluid, wherein the means for removing the contaminants includes the filter element.

10. The centrifuge of claim 1, further comprising an axle extending through the rotor, wherein the axle and the rotor are fixed together for rotating the rotor with the axle.

11. The centrifuge of claim 1, further comprising:

a shaft extending through the rotor; and the rotor including one or more bearings rotatably coupled to the shaft for allowing the rotor to rotate about the shaft.

12. A centrifuge, comprising:

a rotor having one or more drive jet openings for rotating the rotor to separate particulate matter from a fluid;

a depth filter medium disposed in the rotor for removing neutral density contaminants from the fluid;

a base plate;

a center tube extending through the rotor for transporting the fluid;

a compression plate slidably disposed along the center tube, wherein the depth filter medium is sandwiched between the base plate and the compression plate; and a bias device to bias the compression plate against the depth filter medium for compensating for contraction and expansion of the depth filter medium;

wherein the rotor includes a fluid bypass passage configured to bypass a portion of the fluid around the depth filter medium for maintaining pressure of the fluid from the drive jet openings to sustain rotational speed of the rotor.

13. The centrifuge of claim 12, wherein the depth filter medium includes cellulose.

14. The centrifuge of claim 12, further comprising a capsule encapsulating the depth filter medium for disposal purposes.

15. The centrifuge of claim 12, wherein the fluid bypass passage includes one or more fluid ports defined in the center tube.

16. The centrifuge of claim 12, further comprising:

means for separating the particulate matter from the fluid, wherein the means for separating the particulate matter includes the rotor; and means for removing neutral density contaminants, wherein the means for removing the neutral density contaminants includes the depth filter medium; and means for bypassing the portion of the fluid around the depth filter medium, wherein the means for bypassing includes the fluid bypass passage.

17. A centrifuge, comprising:

a rotor shell;

a capsule disposed inside the rotor shell, the capsule having walls configured to collect particulate matter from a fluid during rotation of the capsule;

a filter element disposed in the capsule, the filter element including depth filter medium for filtering contaminants from a fluid;

a center tube extending through the capsule;

the capsule including a base plate;

a compression plate slidably disposed along the center tube inside the capsule;

the depth filter medium being sandwiched between the base plate and the compression plate;

a bias device located inside the capsule and engaged to the compression plate;

the capsule defining one or more fluid supply holes around the center tube; and the capsule including one or more vanes disposed between the fluid supply holes for reducing fluid slippage;

wherein the capsule is removable from the rotor shell for disposal of the particulate matter and the contaminants in the depth filter medium.

18. A centrifuge, comprising:

a rotor configured to rotate for separating particulate matter from a fluid;

a filter element disposed inside the rotor, the filter element including depth filter medium for removing from the fluid contaminants having the same general density as the fluid;

a base plate;

a center tube extending through the depth filter medium for transporting the fluid;

a compression plate slidably disposed along the center tube, wherein the depth filter medium is sandwiched between the base plate and the compression plate; and a bias device to bias the compression plate against the depth filter medium for compensating for contraction and expansion of the depth filter medium;

wherein the base plate and the center tube are integrally formed together, the center tube defines one or more bypass ports for allowing a portion of the fluid to bypass the filter element, and the base plate defines one or more clean fluid ports.

19. A centrifuge, comprising:

a rotor shell;

a capsule disposed inside the rotor shell, the capsule having walls configured to collect particulate matter from a fluid during rotation of the capsule;

a filter element disposed in the capsule, the filter element including depth filter medium for filtering contaminants from a fluid;

a center tube extending through the capsule;

the capsule including a base plate;

a compression plate slidably disposed along the center tube inside the capsule;

the depth filter medium being sandwiched between the base plate and the compression plate; and a spring disposed inside the capsule for biasing the compression plate against the depth filter medium;

wherein the capsule is removable from the rotor shell for disposal of the particulate matter and the contaminants in the depth filter medium, the capsule defining one or more fluid supply holes around the center tube, and the capsule including one or more vanes disposed between the fluid supply holes for reducing fluid slippage.

* * * * *